(12) United States Patent
Wesling et al.

(10) Patent No.: US 7,699,329 B2
(45) Date of Patent: Apr. 20, 2010

(54) MOUNTING SYSTEM FOR AN INTERNAL BICYCLE TRANSMISSION

(75) Inventors: Kevin Wesling, Lombard, IL (US); Christopher Shipman, Chicago, IL (US); Brian Jordan, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 12/100,349

(22) Filed: Apr. 9, 2008

(65) Prior Publication Data

US 2008/0254929 A1 Oct. 16, 2008

Related U.S. Application Data

(63) Continuation-in-part of application No. 11/734,236, filed on Apr. 11, 2007.

(51) Int. Cl.
*F16H 3/44* (2006.01)

(52) U.S. Cl. .................... 280/260; 475/210

(58) Field of Classification Search ............. 280/238, 280/260; 475/312, 297, 8, 331, 210
See application file for complete search history.

(56) References Cited

U.S. PATENT DOCUMENTS

| 866,980 A * | 9/1907 | Taylor .................... 474/231 |
| 4,854,191 A | 8/1989 | Nagano |
| 5,303,942 A | 4/1994 | Schlumpf |
| 5,378,201 A | 1/1995 | Lee et al. |
| 5,609,071 A | 3/1997 | Schlumpf |
| 5,620,384 A | 4/1997 | Kojima |
| 6,383,107 B1 | 5/2002 | Yoo |
| 6,837,822 B2 * | 1/2005 | Wu .......................... 475/269 |

FOREIGN PATENT DOCUMENTS

| EP | 0159855 | 10/1985 |
| EP | 0 922 630 B1 | 6/1999 |
| WO | WO 97/21587 | 6/1997 |
| WO | WO 99/46159 | 9/1999 |

* cited by examiner

*Primary Examiner*—Lesley Morris
*Assistant Examiner*—Levon Fiore
(74) *Attorney, Agent, or Firm*—Milan Milosevic; Lisa Serdynski

(57) ABSTRACT

A bicycle transmission assembly that is mountable to a bottom bracket shell of a bicycle frame. The bicycle transmission generally includes an input crank assembly, an output chainring, a planetary gear mechanism, a control system and a mounting system. The output chainring engages a bicycle drive chain that includes a plurality of chain links. The planetary gear mechanism includes a ring gear and provides a plurality of transmission paths. The planetary gear mechanism is mounted coaxially about the shell axis. The control system is operatively connected to the planetary gear mechanism for selecting one of the plurality of transmission paths. The mounting system mounts the planetary gear mechanism and the control system to the bottom bracket shell. At least one chain link overlaps the ring gear as viewed along the shell axis. The at least one chain link engages the output chainring.

9 Claims, 10 Drawing Sheets

MOUNTING SYSTEM FOR AN INTERNAL BICYCLE TRANSMISSION

RELATED APPLICATION DATA

This application is a continuation-in-part of U.S. application Ser. No. 11/734,236 filed on Apr. 11, 2007, entitled "Mounting System for an Internal Bicycle Transmission."

BACKGROUND OF THE INVENTION

The present invention relates to internal bicycle transmissions and more particularly to a mounting system for mounting an internal bicycle transmission to a bottom bracket shell.

Internal bicycle transmissions may be located at the rear wheel hub and/or at the front crank assembly. Internal bicycle transmissions provide multiple transmission paths corresponding to multiple bicycle gear ratios. Typically, an internal bicycle transmission includes a planetary gear mechanism with a sun gear, a ring gear, a plurality of planet gears meshing with the ring gear, and sun gear and a carrier for supporting the planet gears. To shift between the multiple transmission paths, select elements of the planetary gear mechanism may be locked or unlocked. For example, when the sun gear is locked and the planet gears are driven, the ring gear is overdriven. This is referred to as overdrive, where the output at the ring gear rotates faster than the input at the crank assembly. Conversely, when the output is rotated slower than the input, it is referred to as underdrive. During overdrive, the planet gears drive the ring gear forward, but exert an equal but opposite reactive rotational force on the fixed sun gear. This reactive torque may be substantial. When the sun gear is unlocked, it is prevented from carrying a reactive load from the planet gears. In this condition overdrive is prevented, resulting in the planet gears driving the chainring at a 1:1 gear ratio. An advantage of an overdrive system is that a smaller output chainring can be used, saving weight, and providing more clearance between the chainring and the ground. However, a disadvantage of a smaller chainring is the increased likelihood of chain derailment because there are fewer teeth engaging the chain. A chain management system may be used to inhibit chain derailment.

When the internal bicycle transmission is located at the crank assembly, the planetary gear mechanism is operatively connected to the crank assembly. The crank assembly generally includes crank arms attached to a crank shaft extending through a bottom bracket shell of the bicycle frame. The planetary gear mechanism is operatively connected to an input crank arm and an output chainring that transfers the pedaling force to the rear wheel through a bicycle chain. Existing planetary gear mechanism may be mounted to a mounting plate that is axially pinched between the outboard face of the bottom bracket shell and a threaded cap while being rotationally fixed by the frame tubes, or mounted to a mounting plate that is locked to an interior of a modified bottom bracket shell. One disadvantage of these configurations is that additional elements are mounted to the bottom bracket shell, requiring a redesign of the bottom bracket. Another disadvantage of the configuration that uses of the face of the bottom bracket for axially pinching the ground plate, is that it takes up extra space axially, resulting in a longer axle and a wider stance between pedals. Therefore, there is a need for a mounting system that mounts a planetary gear mechanism to the bottom bracket shell without requiring redesign of the bottom bracket.

SUMMARY OF THE INVENTION

A bicycle transmission is provided that is mountable to a bottom bracket shell of a bicycle frame for improved packaging and ground clearance. The bicycle transmission generally includes an input crank assembly, an output chainring for engaging a bicycle drive chain, a planetary gear mechanism, a control system and a mounting system. The planetary gear mechanism includes a ring gear and is mounted coaxially about an axis of the bottom bracket shell. The planetary gear mechanism provides a plurality of transmission paths. The control system is operatively connected to the planetary gear mechanism for selecting one of the transmission paths. The mounting system mounts the planetary gear mechanism and the control system to the bottom bracket shell. The bicycle drive chain includes a plurality of chain links. In one embodiment of the present invention, at least one of the chain links overlaps the ring gear as viewed along the shell axis. The at least one chain link engages the output chainring.

In one embodiment of the present invention, the ring gear includes a toothed profile. The at least one chain link overlaps the toothed profile of the ring gear as viewed along the shell axis. The output chainring is nonrotatably connected to the ring gear. The control system is mounted coaxially about the shell axis. The planetary gear mechanism further includes a plurality of planet gears and a sun gear. The plurality of planet gears is operatively connected to the input crank assembly. The control system includes at least one sun pawl, a collar and a shift actuator. The collar provides a seat for the at least one sun pawl. The at least one sun pawl is configured to be selectively positionable between an engaged position nonrotatably connecting the sun gear to the collar and a disengaged position allowing the sun gear to rotate relative to the collar. The shift actuator selectively positions the at least one sun pawl between the engaged and disengaged positions.

In one embodiment of the present invention, one of the engaged bicycle drive chain links forms a first radius with respect to the shell axis. The ring gear has a toothed profile bounded by a peak and a base. The ring gear base forms a second radius with respect to the shell axis. The first radius is equal to or less than the second radius. The output chainring is nonrotatably connected to the ring gear. The control system is mounted coaxially about the shell axis. The planetary gear mechanism further includes a plurality of planet gears and a sun gear. The plurality of planet gears is operatively connected to the input crank assembly. The control system includes at least one sun pawl, a collar and a shift actuator. The collar provides a seat for the at least one sun pawl. The at least one sun pawl is configured to be selectively positionable between an engaged position nonrotatably connecting the sun gear to the collar and a disengaged position allowing the sun gear to rotate relative to the collar. The shift actuator selectively positions the at least one sun pawl between the engaged and disengaged positions.

These and other features and advantages of the present invention will be more fully understood from the following description of one or more embodiments of the invention, taken together with the accompanying drawings.

DETAILED DESCRIPTION

Figure 1:
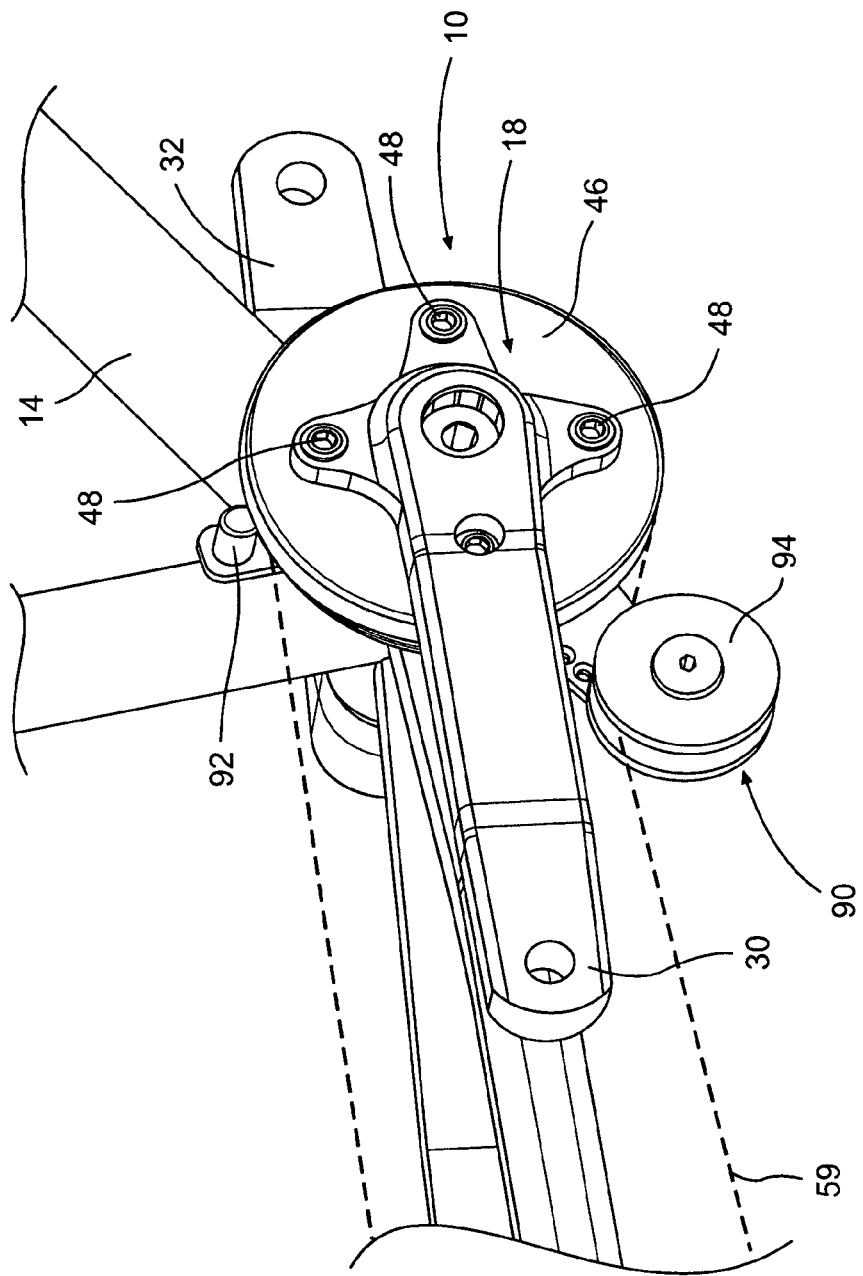
FIG. 1 is a perspective outboard view of a bicycle transmission assembly according to one embodiment of the present invention.

FIGS. 1-11 illustrate a bicycle transmission assembly 10 according to one embodiment of the present invention. Looking to FIGS. 1-4, the bicycle transmission assembly 10 is externally mounted to a bottom bracket shell 12 of a bicycle frame 14. The bottom bracket shell 12 has an axis 16 and connects various tubes of the bicycle frame 14. The bicycle transmission assembly 10 generally includes an input crank assembly 18, an output chainring 20, a planetary gear mechanism 22, a control system 24 and a mounting system 26. The crank assembly 18 is rotatably mounted to the bottom bracket shell 12. The crank assembly 18 includes a bottom bracket 28 that extends through the bottom bracket shell 12, with first and second crank arms 30, 32 rotatably connected to a crank axle 34. The bottom bracket 28 includes the crank axle 34 and bearings 36.

Figure 10:
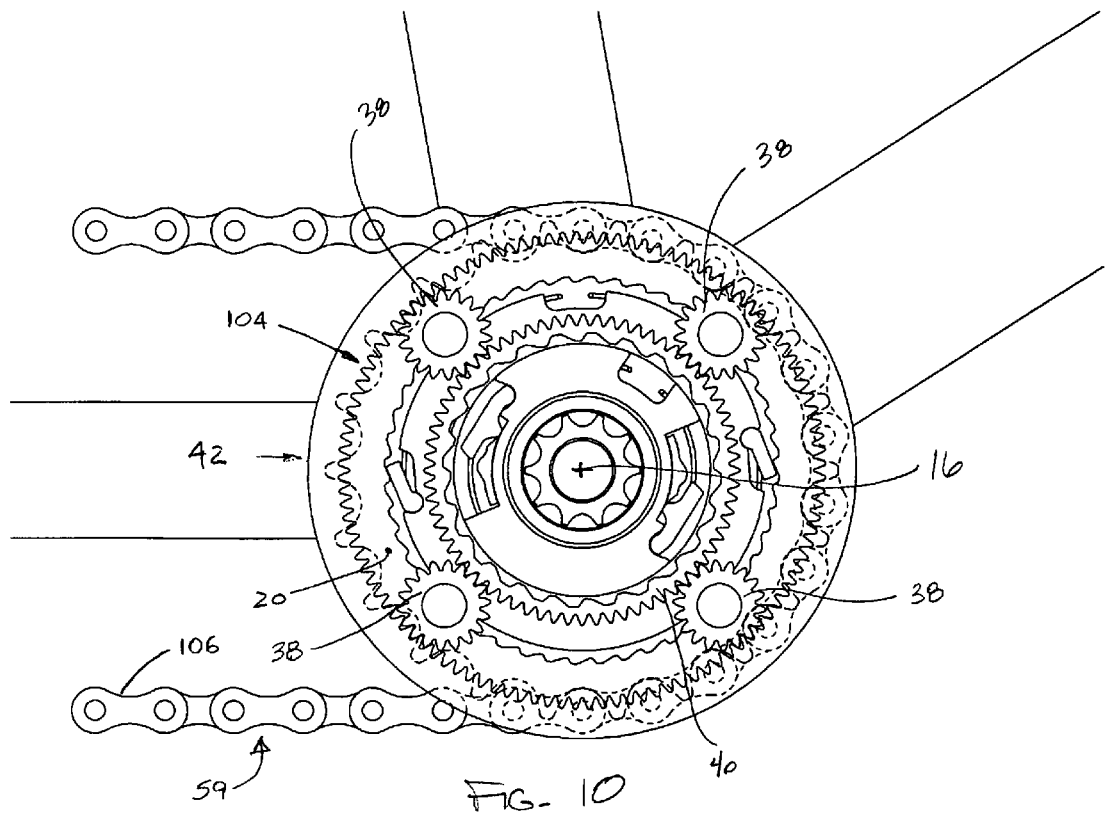
FIG. 10 is a cut-away side view along a bottom bracket shell axis of the bicycle transmission assembly.
Figure 11:
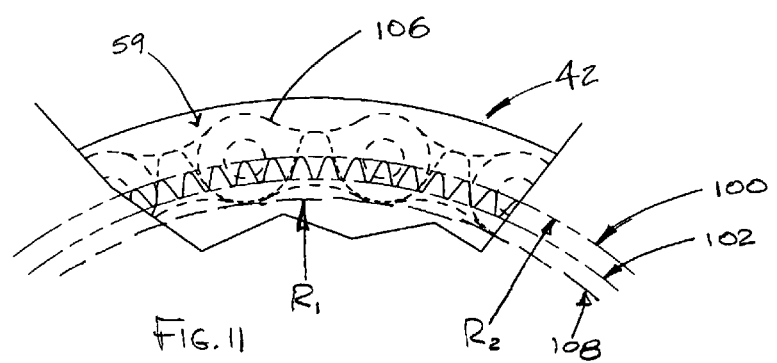
FIG. 11 is partial detailed view of a portion of the bicycle transmission assembly of FIG. 10.

The planetary gear mechanism 22 is mounted coaxially about the shell axis 16 and disposed inboard of the first crank arm 30. The planetary gear mechanism 22 generally includes planet gears 38, a sun gear 40 and a ring gear 42 having a toothed profile 104 bounded by a peak 102 and a base 100 forming a second radius $R_2$. The planet gears 38 are rotatably supported on planet shafts 44 that are fixed to a carrier 46 and the first crank arm 30 by bolts 48. Looking to FIGS. 5-7, the planet gears 38 mesh the sun gear 40 with the ring gear 42. The ring gear 42 includes a first plurality of teeth 50 engaged with teeth 51 of the planet gears 38 and a second plurality of teeth 52 engageable with ring pawls 54 located on the sun gear 40. The sun gear 40 includes a first plurality of teeth 56 engaged with the teeth 51 of the planet gears 38 and a second plurality of teeth 58 engageable with sun pawls 60. The sun and ring gears 40, 42 are rotatably mounted coaxially about the shell axis 16. The output chainring 20 is nonrotatably connected to the ring gear 42 (see FIG. 4). The output chainring 20 engages a bicycle drive chain 59 (see FIGS. 1, 3, 10 and 11) having a plurality of interconnected chain links 106, the engaged chain links forming a first radius $R_1$ between a radially innermost circumference 108 of the chain links 106 and the shell axis 16 (see FIG. 11). The first radius $R_1$ of the chain links is equal to or less than the second radius $R_2$ of the ring gear 42. In FIGS. 10 and 11, the bicycle transmission assembly 10 is configured such that a drive chain link 106, of a portion of the bicycle drive chain 59 engaged with the output chainring 20, overlaps the ring gear 42 as viewed along the shell axis 16. Additionally, the drive chain link 106 may overlap the toothed profile 104 of the ring gear 42. The chainring 20 may be aligned with a middle sprocket of a rear wheel sprocket cassette (not shown) to optimize shifting performance.

The control system 24 is mounted coaxially about the shell axis 16 and generally includes the sun pawls 60, a collar 62 and a shift actuator 64. The collar 62 provides a seat, in this embodiment recesses 66, for the sun pawls 60 and the sun gear 40 is rotatable about the collar 62. The shift actuator 64 includes shift cams 68 and a lever 70 that is connected to a Bowden control cable (not shown). The shift cams 68 are received in the recesses 66 on the collar 62 and are reciprocally displaceable along the recesses 66. The sun pawls 60 are configured to be positionable between an engaged position (see FIG. 6), nonrotatably connecting or locking the sun gear 40 to the collar 62, and a disengaged position (see FIG. 7), allowing the sun gear 40 to rotate relative to the collar 62. A spring biases the sun pawls 60 away from the teeth 58 of the sun gear 40 or toward the disengaged position. The shift cams 68 engage the sun pawls 60 preventing the sun pawls 60 from disengaging from the sun gear teeth 58. When the control cable is actuated, the shift cams 68 displace along the recesses 66 to position the sun pawls 60 in either the engaged or disengaged positions.

Figure 8:
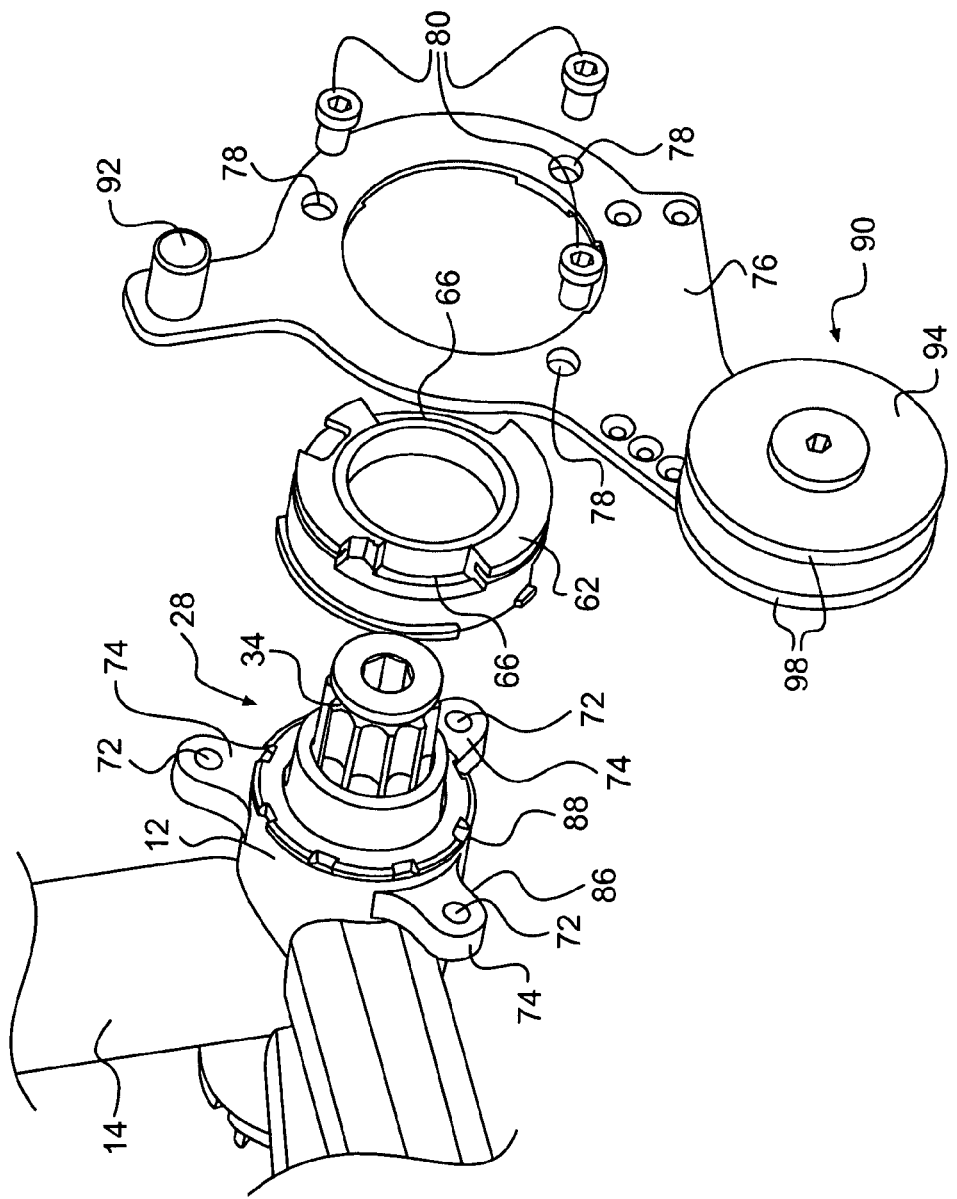
FIG. 8 is an exploded outboard view of a portion of the bicycle transmission assembly of FIG. 1.
Figure 9:
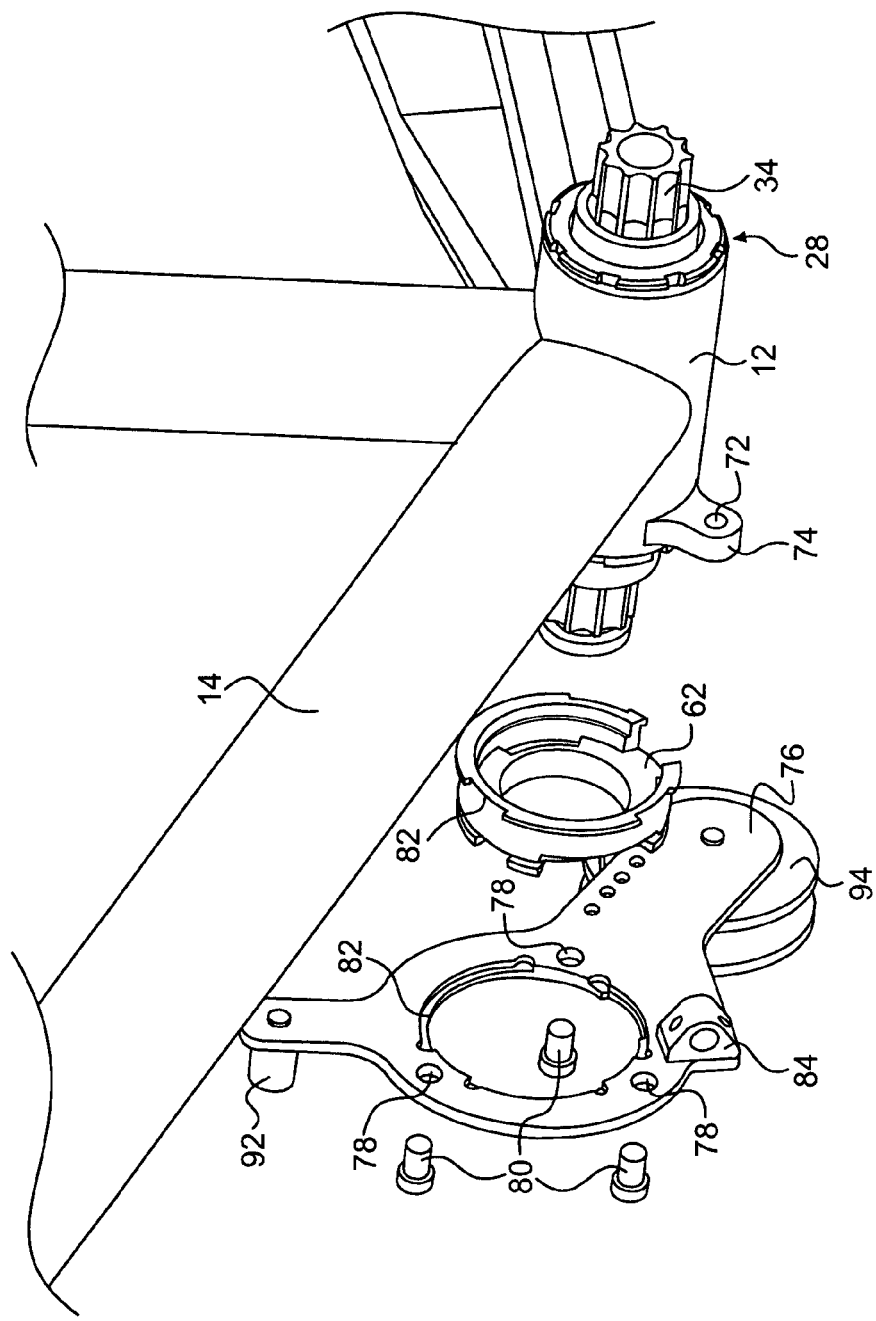
FIG. 9 is an exploded inboard view of a portion of the bicycle transmission assembly of FIG. 1.

Looking to FIGS. 8 and 9, the mounting system 26 includes at least one attachment point 72 disposed on at least one frame boss 74 extending radially outwardly from the bottom bracket shell 12. In this embodiment, the mounting system 26 includes three attachment points 72 disposed on three frame bosses 74 that are equidistantly spaced about the bottom bracket shell 12 or about 120 degrees apart. The mounting system 26 also includes a mounting plate 76 mounted coaxially about the shell axis 16. The mounting plate 76 includes three holes 78 for receiving bolts 80 to mount the plate 76 to the frame bosses 74. The mounting plate 76 and collar 62 include mating projections and recesses 82 to nonrotatably connect the collar 62 to the mounting plate 76. The mounting plate 76 may include a cable housing stop 84 for the Bowden control cable connected to the lever 70.

Figure 3:
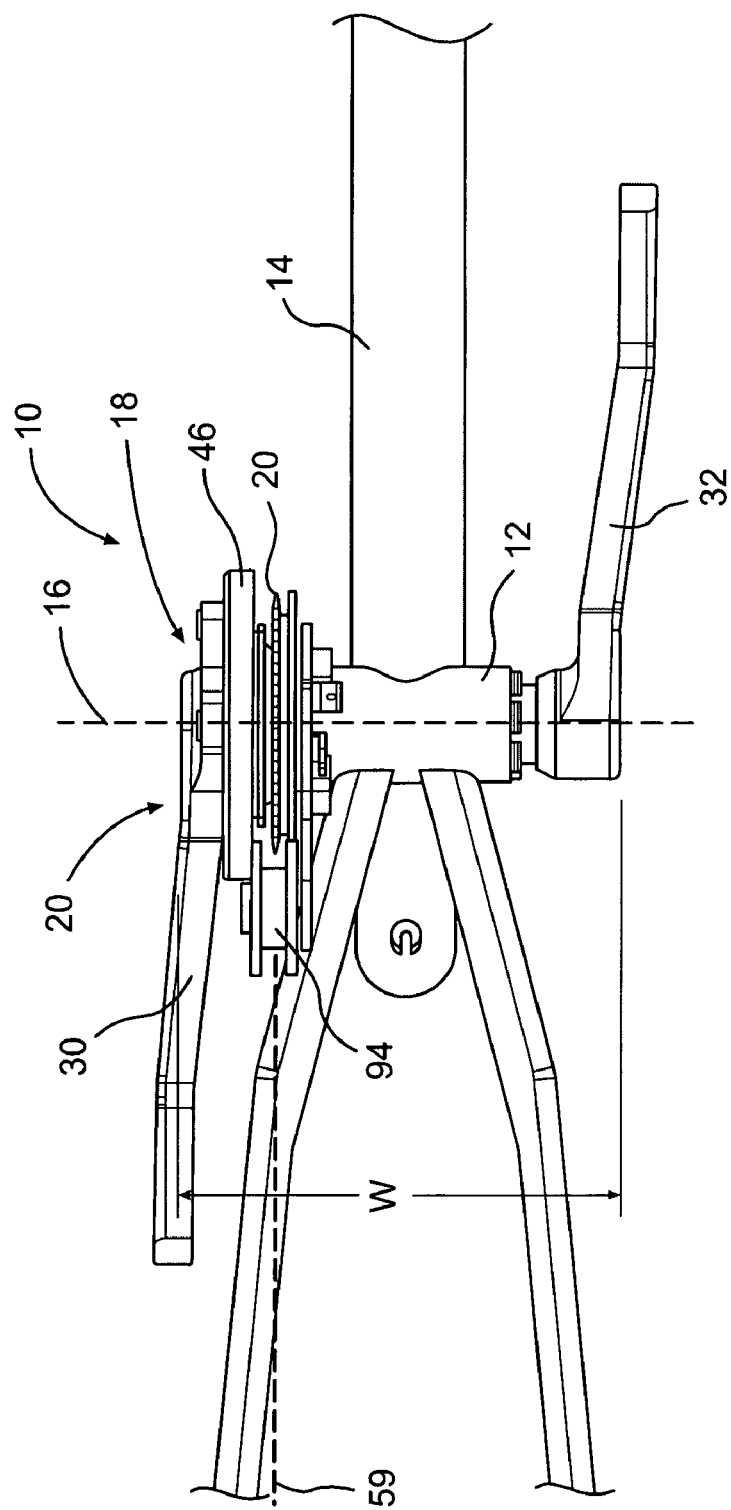
FIG. 3 is a bottom view of the bicycle transmission assembly of FIG. 1.
Figure 4:
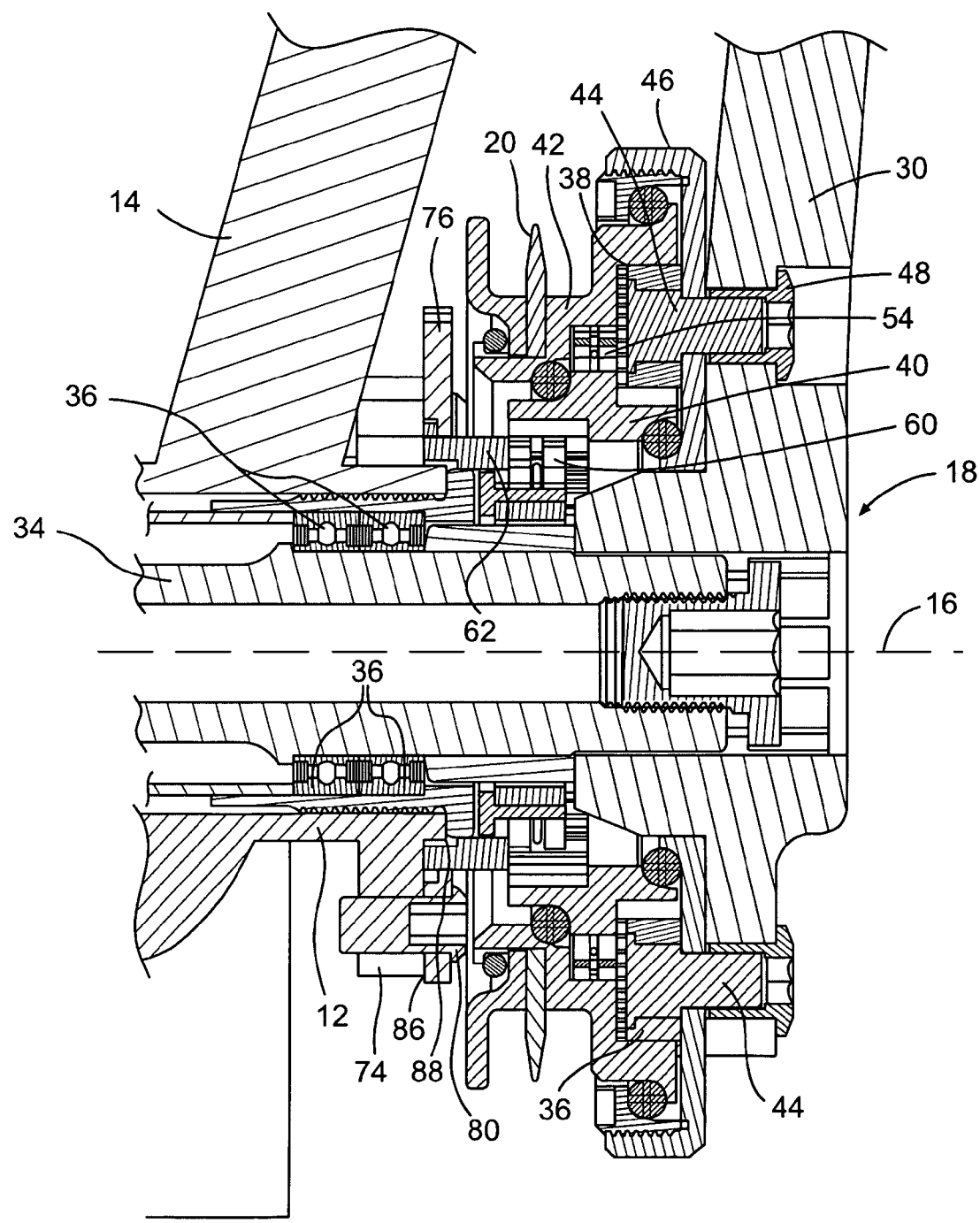
FIG. 4 is a cross-sectional view of the bicycle transmission assembly of FIG. 1.
Figure 5:
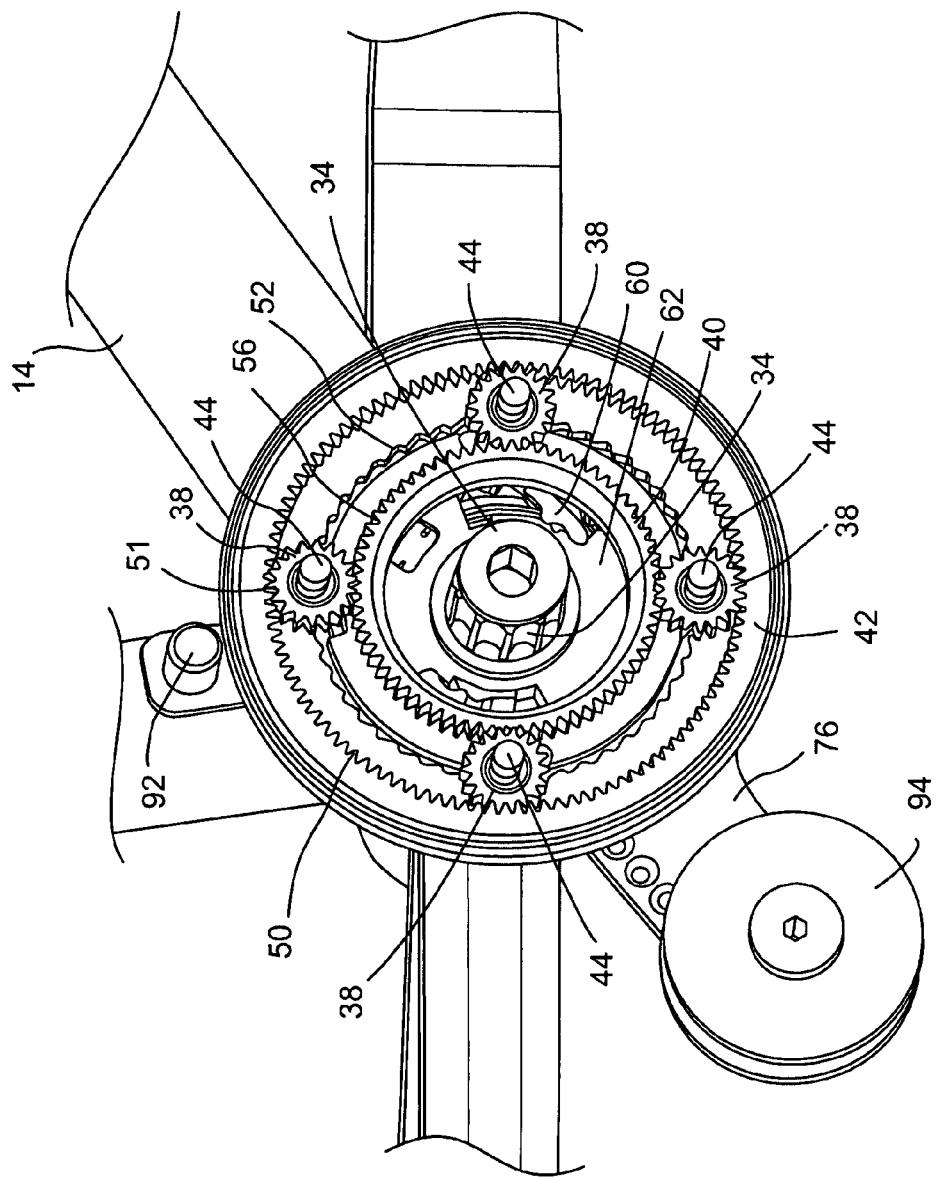
FIGS. 5-7 are cut-away views of the bicycle transmission assembly of FIG. 1.
Figure 6:
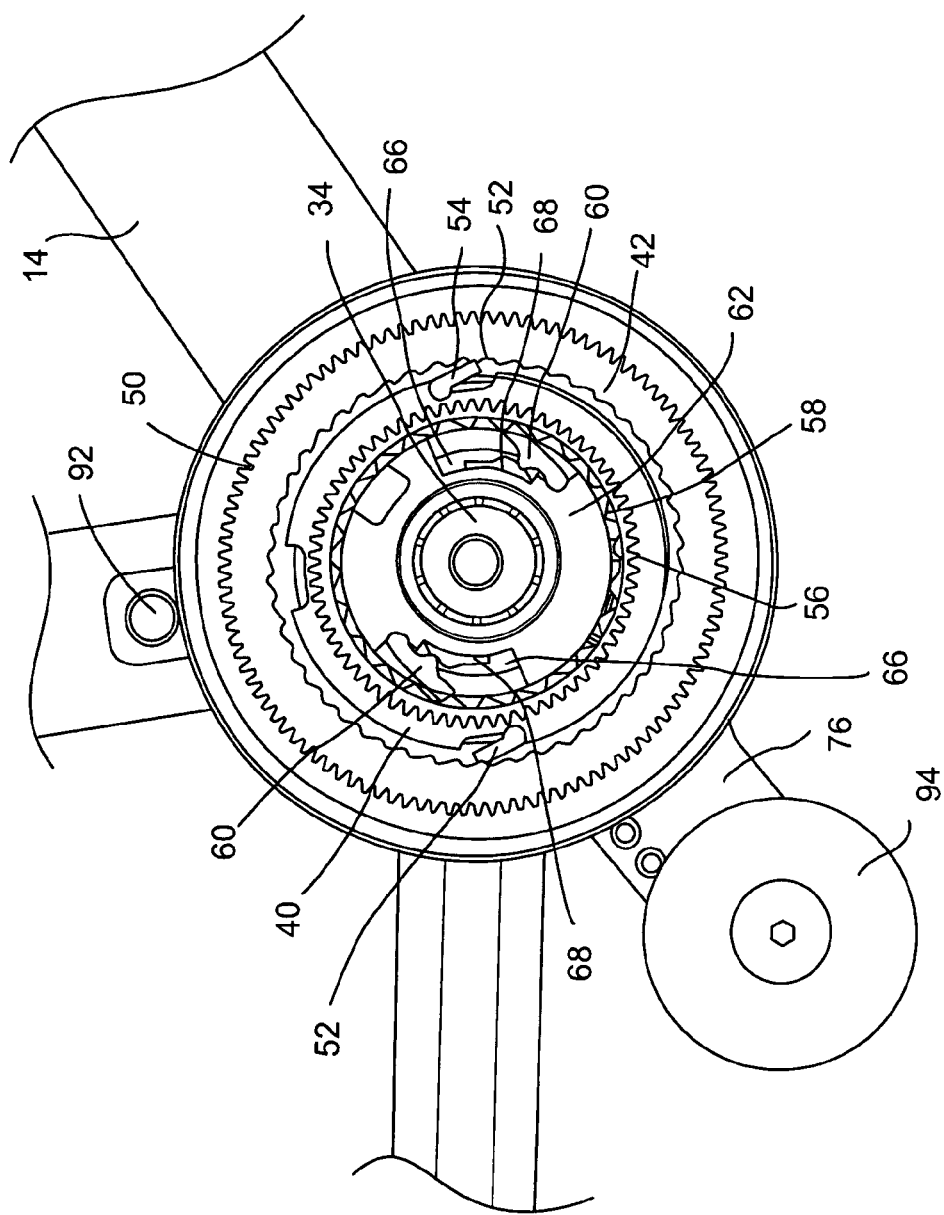
Figure 7:
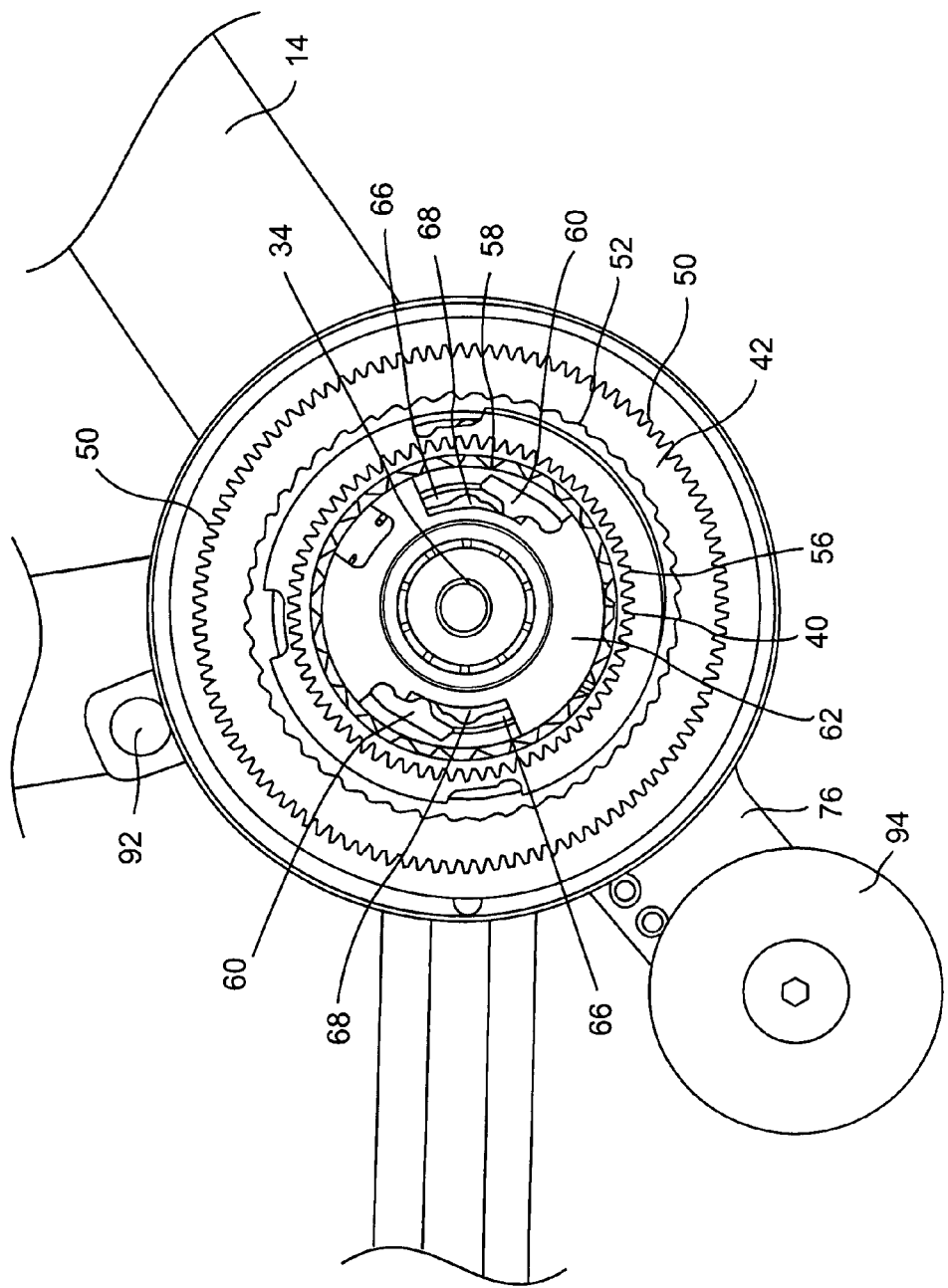

By providing attachment points 72 on the frame bosses 74 extending radially from the bottom bracket shell 12, the bicycle transmission assembly 10 may be mounted without increasing the existing crank assembly width W (see FIG. 3). In the embodiment shown, an outboard surface 86 of the attachment point 72 is positioned axially inboard of an outboard surface 88 of the bottom bracket shell 12.

Figure 2:
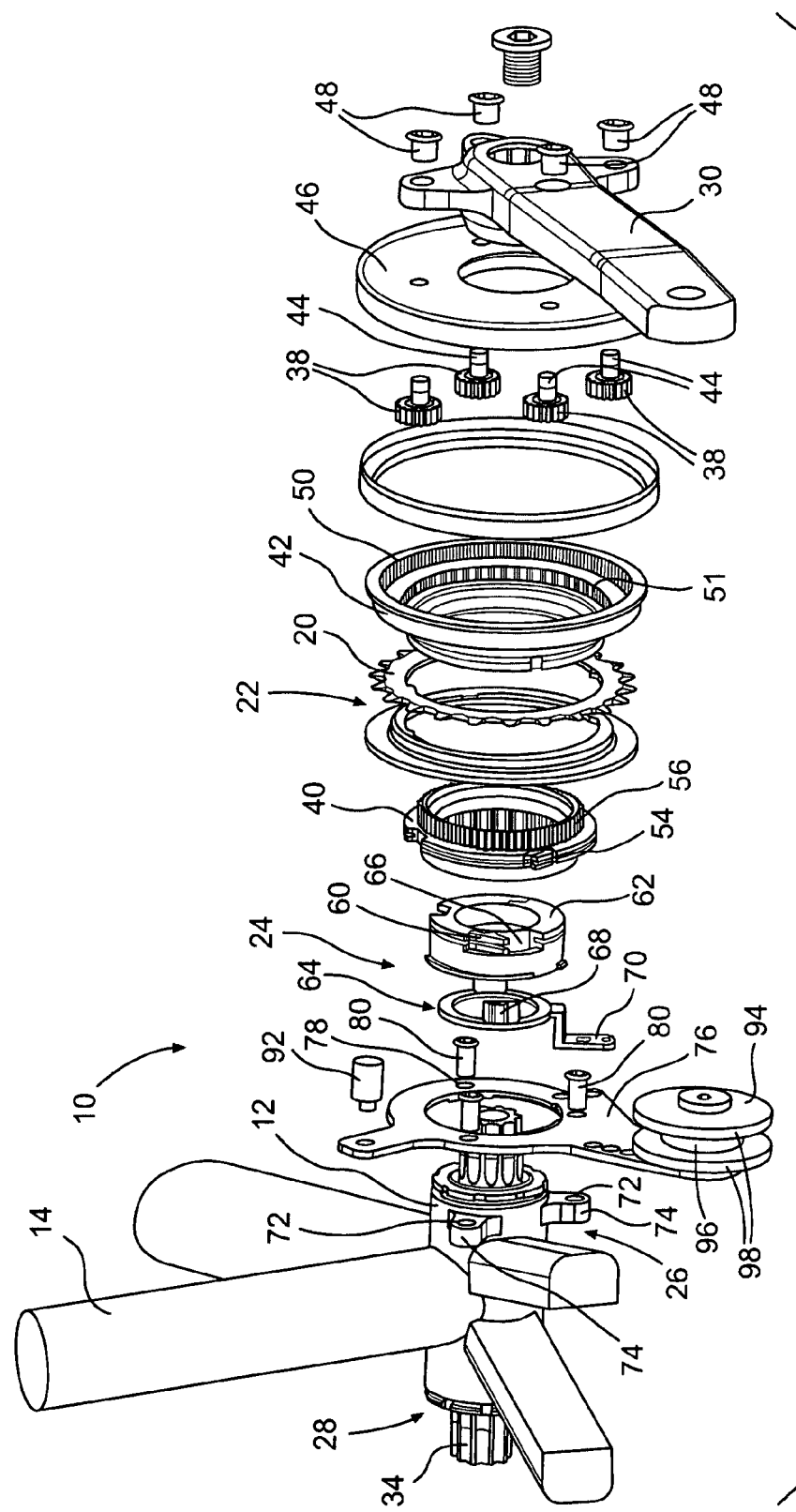
FIG. 2 is an exploded view of the bicycle transmission assembly of FIG. 1.

Looking to FIGS. 1, 2 and 8, in one embodiment of the present invention, a chain management system 90 is attached to the mounting plate 76. The chain management system 90 includes a chain guide 92 for preventing disengagement of the chain 59 from the output chainring and/or a roller 94 rotatably attached to the mounting plate 76 for rollingly guiding the chain 59. The chain 59 runs under the chain guide 92. The roller 94 includes a roller portion 96 for the chain 59 to ride on and two sidewalls 98 to axially position the chain 59. The roller 94 may be aligned with the chainring 20. In other embodiments, the roller 94 may be mounted to alternative positions on the mounting plate 76.

The bicycle transmission provides at least two transmission paths. When the sun pawl 60 is in the engaged position, the sun gear 40 is locked to the collar 62, wherein rotation of the input crank assembly 18 drives the planet gears 38 to rotate about the planet shafts 44 thereby overdriving the ring gear 42, resulting in the output chainring 20 being rotated faster than the input crank arms 18. When the sun pawl 60 is in the disengaged position, the sun gear 40 is unlocked from the collar 62, and initial rotation of the input crank assembly 18 first drives the planet gears 38 to rotate about the planet shafts 44 thereby rotating the sun gear 40 until the ring pawls 54 engage the ring gear 42 thereby locking the sun gear 40 to the ring gear 42. Continued rotation of the crank assembly 18, directly drives the both the sun and ring gears 40, 42 in a 1:1 gear ratio.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle transmission assembly mountable to a bottom bracket shell of a bicycle frame, the bottom bracket shell having an axis, the bicycle transmission assembly comprising:
    an input crank assembly;
    an output chainring for engaging a bicycle drive chain including a plurality of chain links;
    a planetary gear mechanism including a plurality of planet gears and a ring gear having teeth engaging the plurality of planet gears, the planetary gear mechanism mounted coaxially about the shell axis and providing a plurality of transmission paths;
    a control system operatively connected to the planetary gear mechanism for selecting one of the plurality of transmission paths; and
    a mounting system for mounting the planetary gear mechanism and the control system to the bottom bracket shell,
    at least one chain link overlapping the teeth of the ring gear as viewed along the shell axis, the output chainring nonrotatably connected to the ring gear.

2. The bicycle transmission assembly of claim 1, wherein the at least one chain link engages the output chainring.

3. The bicycle transmission assembly of claim 1, wherein the control system is mounted coaxially about the shell axis.

4. The bicycle transmission assembly of claim 3, wherein the planetary gear mechanism further includes a sun gear, the plurality of planet gears operatively connected to the input crank assembly.

5. The bicycle transmission assembly of claim 4, wherein the control system includes:
    at least one sun pawl;
    a collar providing a seat for the at least one sun pawl, the at least one sun pawl configured to be selectively positionable between an engaged position nonrotatably connecting the sun gear to the collar and a disengaged position allowing the sun gear to rotate relative to the collar; and
    a shift actuator for selectively positioning the at least one sun pawl between the engaged and disengaged positions.

6. A bicycle transmission assembly mountable to a bottom bracket shell of a bicycle frame, the bottom bracket shell having an axis, the bicycle transmission assembly comprising:
    an input crank assembly;
    an output chainring engaged by a bicycle drive chain including a plurality of chain links, one of the engaged bicycle drive chain links having a radially innermost circumference forming a first radius with respect to the shell axis;
    a planetary gear mechanism including a plurality of planet gears and a ring gear having a toothed profile engaging the plurality of planet gears, the toothed profile bounded by a peak and a base, the ring gear base forming a second radius with respect to the shell axis,
    the planetary gear mechanism mounted coaxially about the shell axis and providing a plurality of transmission paths;
    a control system operatively connected to the planetary gear mechanism for selecting one of the plurality of transmission paths; and
    a mounting system for mounting the planetary gear mechanism and the control system to the bottom bracket shell,
    the output chainring nonrotatably connected to the ring gear,
    the first radius being one of equal to and less than the second radius.

7. The bicycle transmission assembly of claim 6, wherein the control system is mounted coaxially about the shell axis.

8. The bicycle transmission assembly of claim 7, wherein the planetary gear mechanism further includes a sun gear, the plurality of planet gears operatively connected to the input crank assembly.

9. The bicycle transmission assembly of claim 8, wherein the control system includes:
    at least one sun pawl;
    a collar providing a seat for the at least one sun pawl, the at least one sun pawl configured to be selectively positionable between an engaged position nonrotatably connecting the sun gear to the collar and a disengaged position allowing the sun gear to rotate relative to the collar; and
    a shift actuator for selectively positioning the at least one sun pawl between the engaged and disengaged positions.

* * * * *